(No Model.) 3 Sheets—Sheet 1.

W. WALKER.
WEED AND GRASS CUTTER.

No. 461,459. Patented Oct. 20, 1891.

WITNESSES
F. L. Durand.
Van Burrn Hillyard.

INVENTOR
William Walker.
By R. S. & A. P. Lacey
His Attorney (No Model.) 3 Sheets—Sheet 2.

W. WALKER.
WEED AND GRASS CUTTER.

No. 461,459. Patented Oct. 20, 1891.

WITNESSES
F. L. Ouraud
Van Buren Hillyard

INVENTOR
William Walker
By R. S. & A. P. Lacey
His Attorney (No Model.) 3 Sheets—Sheet 3.
W. WALKER.
WEED AND GRASS CUTTER.
No. 461,459. Patented Oct. 20, 1891.
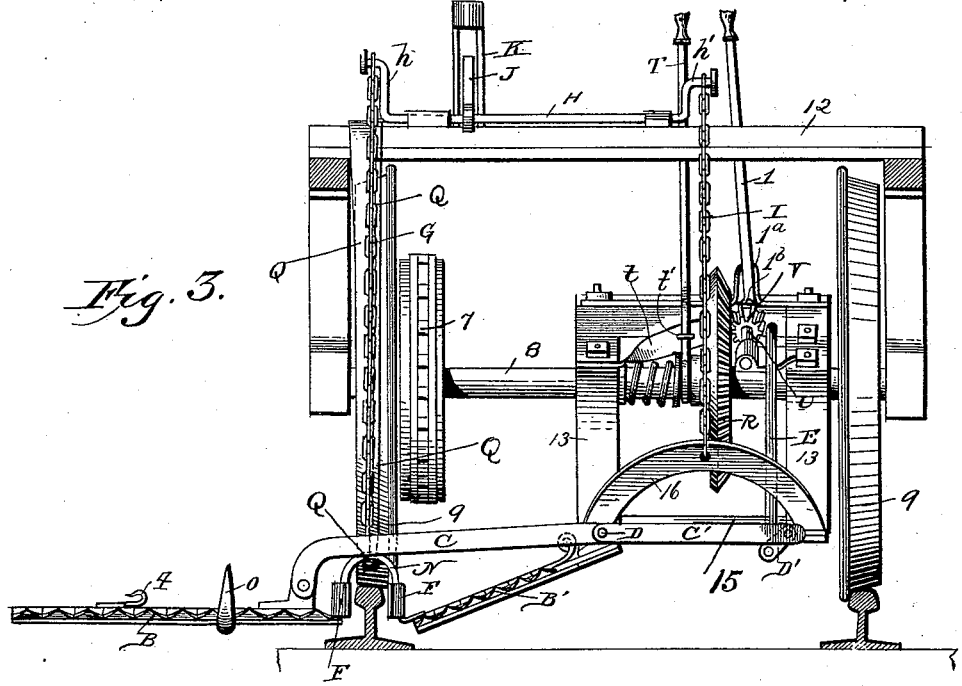
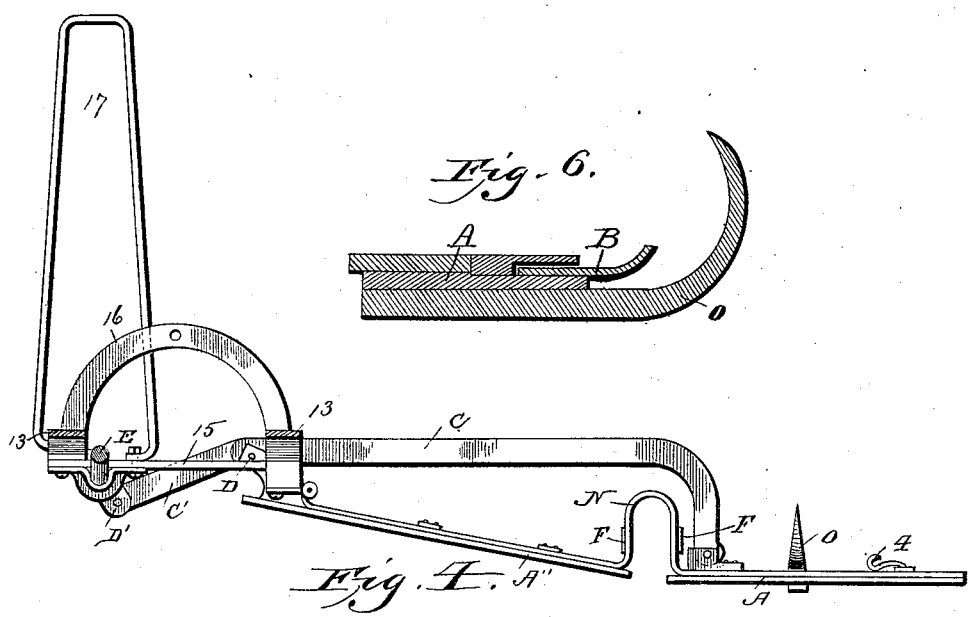
WITNESSES
F. L. Ourand
Van Buren Hillyard.
INVENTOR
William Walker.
By R. S. & A. P. Lacey
his Attorney

UNITED STATES PATENT OFFICE.

WILLIAM WALKER, OF SCANDIA, KANSAS.

WEED AND GRASS CUTTER.

SPECIFICATION forming part of Letters Patent No. 461,459, dated October 20, 1891.

Application filed August 19, 1890. Serial No. 362,430. (No model.)

*To all whom it may concern:*

Be it known that I, WILLIAM WALKER, a citizen of the United States, residing at Scandia, in the county of Republic and State of Kansas, have invented certain new and useful Improvements in Weed and Grass Cutters; and I do hereby declare the following to be a full, clear, and exact description of the invention, such as will enable others skilled in the art to which it appertains to make and use the same.

This invention relates to track-clearers, and aims to provide a simple and efficient machine for removing grass, weeds, and other growth from the bed of a railroad-track.

The improvement consists of the novel mechanism and devices which hereinafter will be more fully described and claimed, and which are shown in the annexed drawings, in which—

Figure 1:
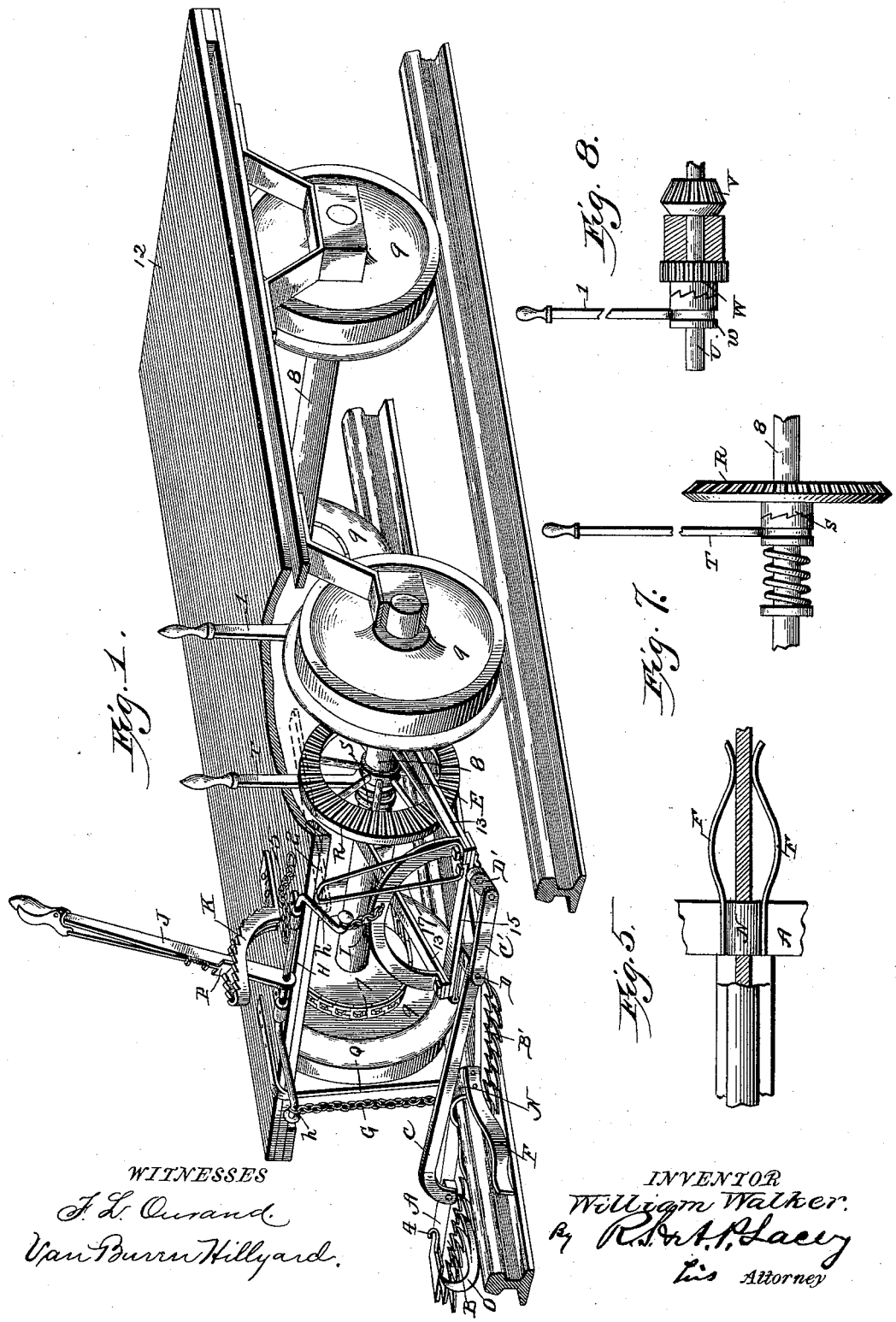
Figure 2:
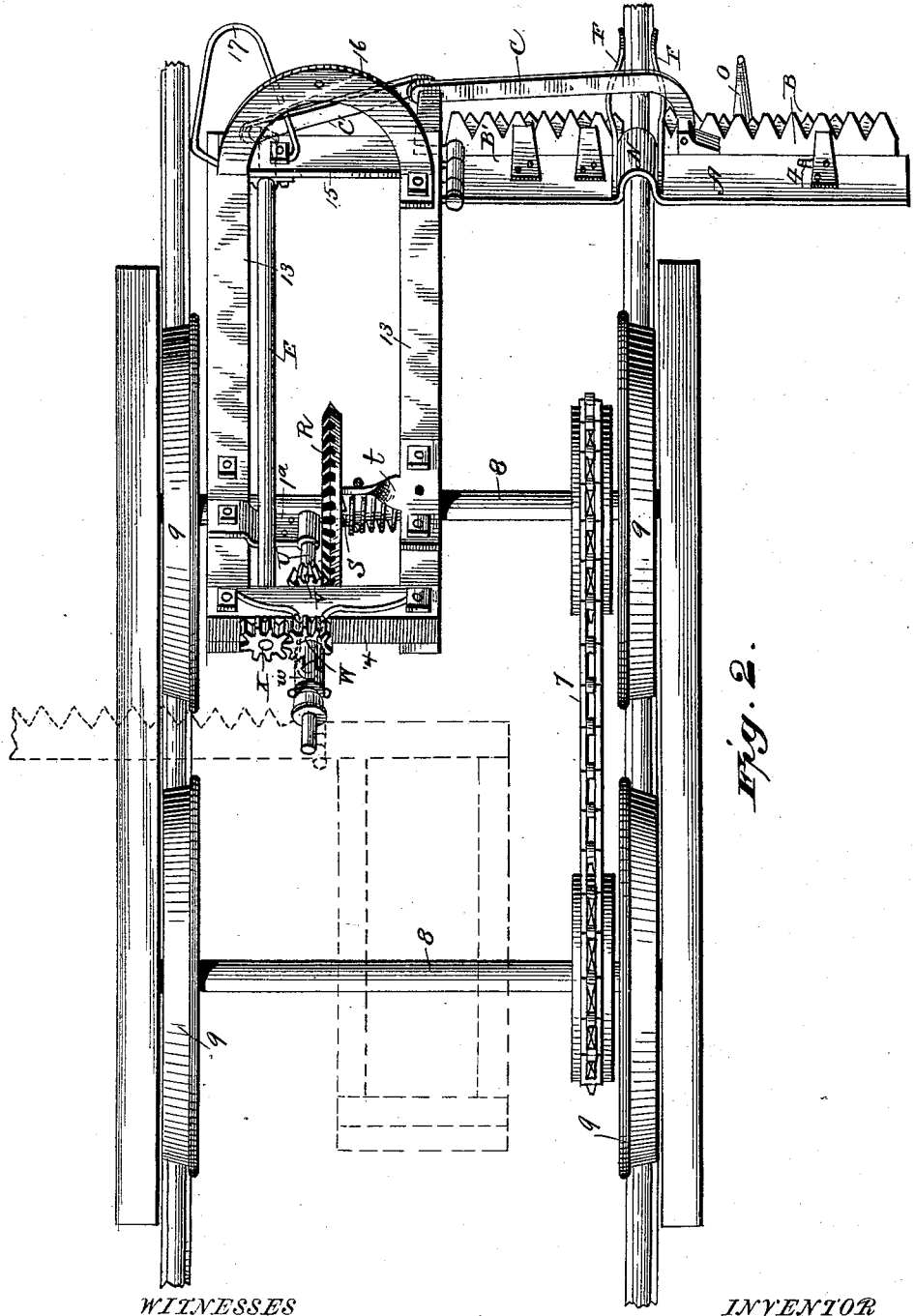

Figure 1 is a perspective view, parts being broken away, of a machine embodying my invention. Fig. 2 is a plan view just beneath the platform of the car or vehicle. Fig. 3 is a front view of the machine. Fig. 4 is a rear view of the cutting apparatus. Fig. 5 is a detail view of the leaders or guards on the cutter-bar. Fig. 6 is a detail view of the shoe. Fig. 7 is a detail view of the gear-wheel and clutch on the axle. Fig. 8 is a detail view of the gearing intermediate the crank-shaft which drives the cutting apparatus and the gear-wheel on the axle.

In the present drawings, 12 indicates the platform of the truck or vehicle, which is mounted on the axles 8 8, which have the supporting-wheels 9 9 at their ends. The frame which carries the cutting apparatus and the mechanism for transmitting motion from the axle to the said cutting apparatus is composed of the parallel side bars 13 13, end bars 14 and 15, connecting the side bars 13 at their ends, and the curved bar 16, the latter being located at the front end of the said frame.

In constructing this machine a set of gearing is placed upon the axle of the car, truck, or platform of a vehicle, which, when the car or vehicle is in motion, will give motion to the sickle-bars. The finger-bar A is constructed with an arch N at a point immediately over the rail, which permits the sickles to drop one or more inches below the top of the rail, thereby cutting sufficiently low to prevent the weeds and grass from interfering with the wheels of the trains. There are two sickles B and B', one on each side of the rail, which are connected by the arch N, thereby practically forming but one sickle having the portions B and B' connected by the arch N and operated from the crank-shaft E by the pitmen C and C'. The pitman C of the outside portion B of the sickle is connected with the pitman-pin D of the inner sickle B', the inner sickle being driven by a pitman C', which is connected with the crank-shaft E, which is journaled near its ends in the end bars 14 and 15. The inner portion of finger or guard-bar A'' is bent to an angle, so as to conform to the contour of the track between the rails. On each side of the arch or curve N there is a guard or leader F, which performs two functions—to keep the finger or guard bar A'' in one position over the rail and to lead the weeds and grass from the rail into the knives or sickle to be cut thereby. On the outside portion of finger or guard bar A'', intermediate its ends, there is placed a runner or shoe O, for the purpose of carrying said bar A over obstacles. Attached to bar A is a chain G or its equivalent, connected with a crank $h$ at the end of rock-shaft H to enable the operator to raise and lower said bar at will.

Rock-shaft H is placed on the platform of the car or vehicle and has connections by a chain I with frame or support of crank-shaft E, which enables the operator to raise and lower crank-shaft and bar A at will, the chain I being attached to crank $h'$ at the end of the rock-shaft. Connected to rock-shaft H is an upright handle J, supported by a curved brace K, having notches or teeth which receive a catch or stop P, placed on handle J for the purpose of holding the finger-bar A and crank-shaft E in any desired position.

Projecting downward from the top of the platform is a rod or bar Q, with its lower end near the top of the rail, so formed as to make a seat or rest for bar A, said bar Q passing through the arch or curve N of the bar A, holding it in position while the machine is in motion.

Wheel R is placed upon axle of the car and has a clutch S attached for the purpose of enabling the operator to throw the machine in and out of gear at will by use of lever T, which is pivoted at t' to the bracket t, which is projected from a side bar 13 of the crank-shaft-supporting frame. Wheel R is connected to shaft U with pinion V and meshes into the same. Upon shaft U there is a clutch-pinion W, meshing into pinion X, which is placed upon crank-shaft E. There is a lever 1 pivoted at 1$^b$ to bracket 1$^a$, and which is connected with clutch w, splined on the shaft U to move the clutch w to and from the clutch-pinion W, which enables the operator to throw the same in and out of gear or mesh at will.

There is a bar or arm 2 projecting out from the platform immediately over the frame of crank-shaft E and carrying frame of shaft E when the machine is in motion. The loop 17, projected up from the frame of crank-shaft E, passes over the said bar 2, as shown in Fig. 1, and supports the front end of the said frame while the machine is in operation.

Attached to bar A is hook 4, used for the purpose of holding bar up when not used. Said hook 4 is caught by chain 5 to hold said bar up whenever desired.

There are placed upon the axles of the car one or more sprocket-wheels to be connected by an endless chain 7, for the purpose of securing as much power from the traction of the wheels as possible to drive the mower.

This machine may be worked by either man or horse or steam power, as may be desired. It can be made to cut the weeds and grass on each side of the track at the same time by placing cutting mechanism on each axle.

Axles 8 8 and wheels 9 9 9 9 are used for the purpose of driving the machinery.

Having thus described my invention, what I claim, and desire to secure by Letters Patent, is—

1. In a track-clearer, a cutting apparatus having a yoke or arch to straddle the rail, substantially as and for the purpose described.

2. In a track-clearer, the combination, with the cutting apparatus, of guides or leaders projecting forward therefrom and spanning the sides of the rail, substantially as described, for the purpose specified.

3. In a track-clearer, the combination, with the cutting apparatus having a yoke or arch to span the rail, of leaders or guides projecting forward from the sides of the arch or yoke, substantially as described.

4. In a track-clearer, the combination, with the cutting apparatus having a portion on each side of the rail and a yoke or arch spanning the rail and connecting the two portions of the cutting apparatus, of a pitman connecting the inner portion of the cutting apparatus with a crank-shaft, and a second pitman connecting the outer portion of the cutting apparatus with the inner end of the aforesaid pitman, substantially as described.

5. In a track-clearer, a cutting apparatus having an arch to straddle the rail, the inner portion of the said cutting apparatus being bent up at an angle, substantially as described.

In testimony whereof I affix my signature in presence of two witnesses.

WILLIAM WALKER.

Witnesses:
ALLIE C. SMITH,
W. E. MILLS.